US010509791B2

(12) United States Patent
Jeon et al.

(10) Patent No.: US 10,509,791 B2
(45) Date of Patent: Dec. 17, 2019

(54) STATISTICAL FEATURE ENGINEERING OF USER ATTRIBUTES (71) Applicant: Facebook, Inc., Menlo Park, CA (US)

(72) Inventors: Sung-eok Jeon, Bellevue, WA (US);
Aliasgar Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 402 days.

(21) Appl. No.: 15/064,344

(22) Filed: Mar. 8, 2016

(65) Prior Publication Data
US 2017/0262445 A1  Sep. 14, 2017

(51) Int. Cl.
G06F 16/2457 (2019.01)
H04L 29/08 (2006.01)
G06N 20/00 (2019.01)
G06F 16/335 (2019.01)
G06F 16/9535 (2019.01)

(52) U.S. Cl.
CPC ...... G06F 16/24578 (2019.01); G06F 16/337 (2019.01); G06F 16/9535 (2019.01); G06N 20/00 (2019.01); H04L 67/22 (2013.01); H04L 67/306 (2013.01); H04L 67/20 (2013.01)

(58) Field of Classification Search
CPC ........... G06F 9/30036; G06F 17/30256; G06F 17/30687; G06F 17/3069
See application file for complete search history.

(56) References Cited

U.S. PATENT DOCUMENTS

| 8,924,993 | B1* | 12/2014 | Niebles Duque | H04L 29/06462 725/9 |
| 2010/0293175 | A1* | 11/2010 | Vadrevu | G06F 17/30864 707/759 |
| 2011/0258049 | A1* | 10/2011 | Ramer | G06F 17/30867 705/14.66 |
| 2011/0307332 | A1* | 12/2011 | Kim | G06Q 30/02 705/14.49 |
| 2013/0212173 | A1* | 8/2013 | Carthcart | G06Q 50/01 709/204 |
| 2014/0280350 | A1* | 9/2014 | Liu | G06F 17/30702 707/793 |
| 2015/0058148 | A1* | 2/2015 | Grosz | G06Q 30/0269 705/26.2 |
| 2015/0193650 | A1* | 7/2015 | Ho | A61M 16/06 382/128 |
| 2017/0161619 | A1* | 6/2017 | Franceschini | G06N 5/022 |
| 2017/0249594 | A1* | 8/2017 | Ortigas | G06Q 10/1053 |

* cited by examiner

Primary Examiner — Amanda L Willis
Assistant Examiner — Vaishali Shah
(74) Attorney, Agent, or Firm — Fenwick & West LLP (57) ABSTRACT A method trains a model for providing content items to users of a social networking system. The system generates profile vectors based on user profile information such as demographic data and personal data. The system logs actions performed by users on the social networking system and generates behavior vectors based on the logged actions. The profile vectors and behavior vectors are each associated with a user attribute, e.g., the age or gender of a user. The system generates a difference vector based on a profile vector and a behavior vector. The difference vector is then used as a feature to train the model using machine learning techniques. The trained model may select content items that a target user is most likely to be interested in and interact with.

18 Claims, 5 Drawing Sheets

Receive user profile information for a user of a social networking system.
501

Generate a profile vector associated with a user attribute based on the user profile information.
502

Maintain actions performed by the user on the social networking system.
503

Generate a behavior vector associated with the user attribute based on the actions performed by the user.
504

Generate a difference vector based on the difference between the profile vector and the behavior vector.
505

Train a model configured for providing content to the user, based on the user attribute, using the difference vector as a feature.
506

FIG. 5

STATISTICAL FEATURE ENGINEERING OF USER ATTRIBUTES

BACKGROUND

This disclosure relates generally to social networking systems, and in particular to statistical modeling based on actions of users of a social networking system.

A social networking system typically has access to large amounts of information describing actions performed by users that may be of interest to other users of the social networking system or to third parties. These actions include photo and video uploads, status updates, transactions, wall posts, posting of comments, recommendations, likes indicated on other users' photos, videos, and the like. The social networking system stores other types of information that is likely to be of interest to users, for example, activities related to social groups or events represented in the social networking system. The social networking system presents social information as content items such as news feed stories.

Users of the social networking system may provide user profile information, such as age and gender, to the system when joining the system and afterwards. The system may select content items for presentation to users based on the user profile information. For example, a content item targeted to females may be selected to be presented to users who indicate that their gender is female in their user profile information. However, stories selected only based on user profile information may not be the stories that users are most interested in and likely to interact with.

SUMMARY

Users of a social networking system interact with other users and objects, such as news feed stories and other content of the system. To provide an engaging user experience for a user, the social networking system presents content items specifically selected for the user based on information that is likely to interest the user, traditionally based on the user's profile information. However, sometimes users display behavior indicative of interests or characteristics that differ from their user profile. For instance, a user indicates on the user's profile of the social networking system that the user likes basketball. Thus, the social networking system may present content items relevant to basketball to the user. However, interactions of the user on the social networking system also indicate that the user views significant amounts of content relevant to swimming. To account for the user's behavior, the social networking system also may want to present content items to the user relevant to swimming. Further, the social networking system may be interested in how frequently the user exhibits behaviors that are similar to or different from what is expected for the user based on their profile information.

A method trains a model for providing content to users of a social networking system. The system generates profile vectors based on user profile information such as demographic data and personal data provided by users. The system logs actions performed by users on the social networking system and generates behavior vectors based on the logged actions. The profile vectors and behavior vectors each represent a user attribute, e.g., the age, gender, or income level of a user. Two or more attribute bins correspond to a range of values in a distribution of values of the user attribute. For example, an attribute bin may represent a range of age values, 0-20 years old, in a distribution of values of an age user attribute, e.g., 0-100 years old. Each attribute bin has a score indicating how closely information about a user (e.g., profile information or behavior information) matches attributes characteristic of the ranges corresponding to the two or more attribute bins. The system generates a difference vector based on the difference of scores of attribute bins between a profile vector and a behavior vector. The difference vector is then used as a feature to train the model using machine learning techniques. The trained model may select stories and content items that a target user and/or population of users are most likely to be interested in and interact with.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
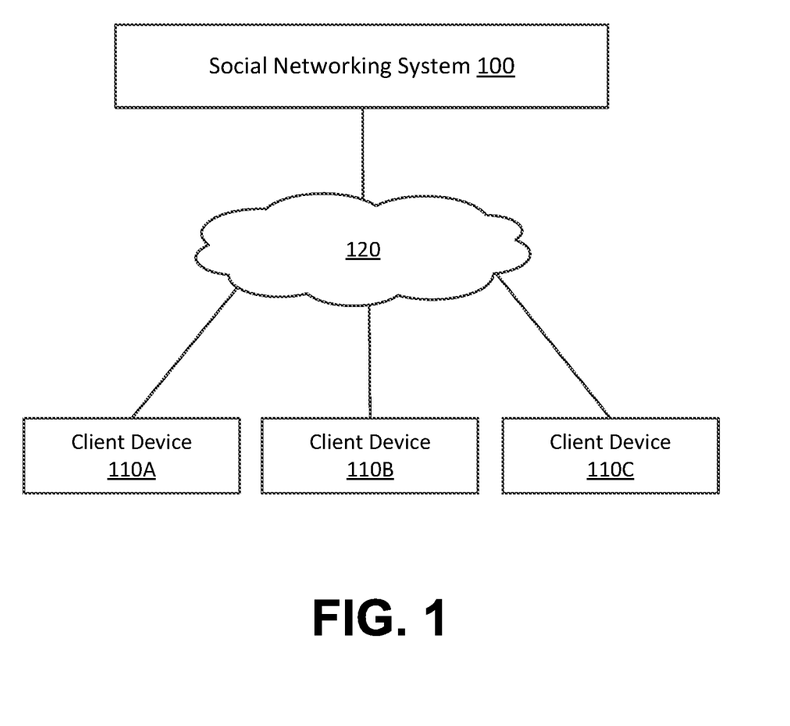
FIG. 1 is a diagram of a system environment for statistical feature engineering within a social networking system according to one embodiment.
Figure 2:
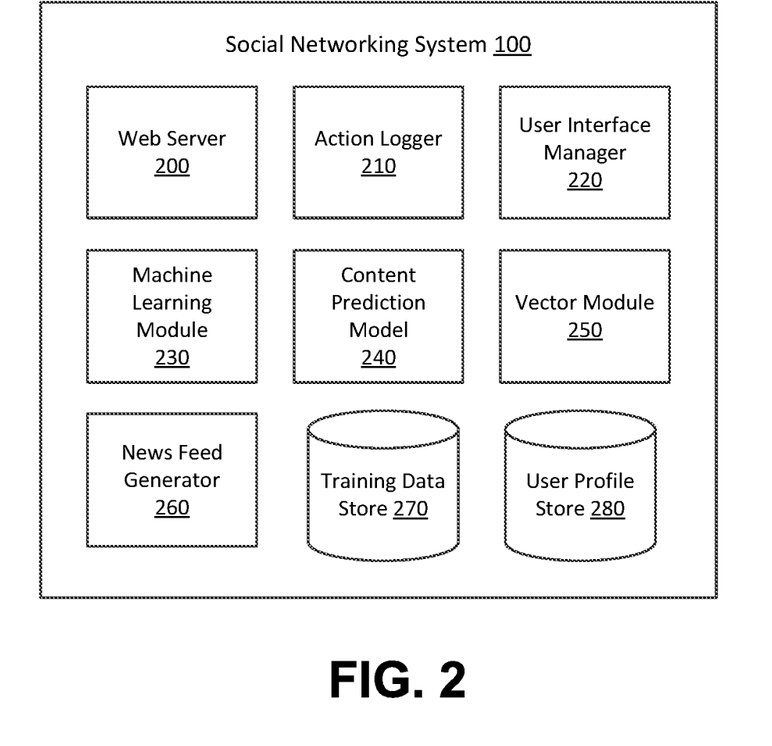
FIG. 2 is a diagram of the system architecture of a social networking system within the environment of FIG. 1 according to one embodiment.
Figure 3:
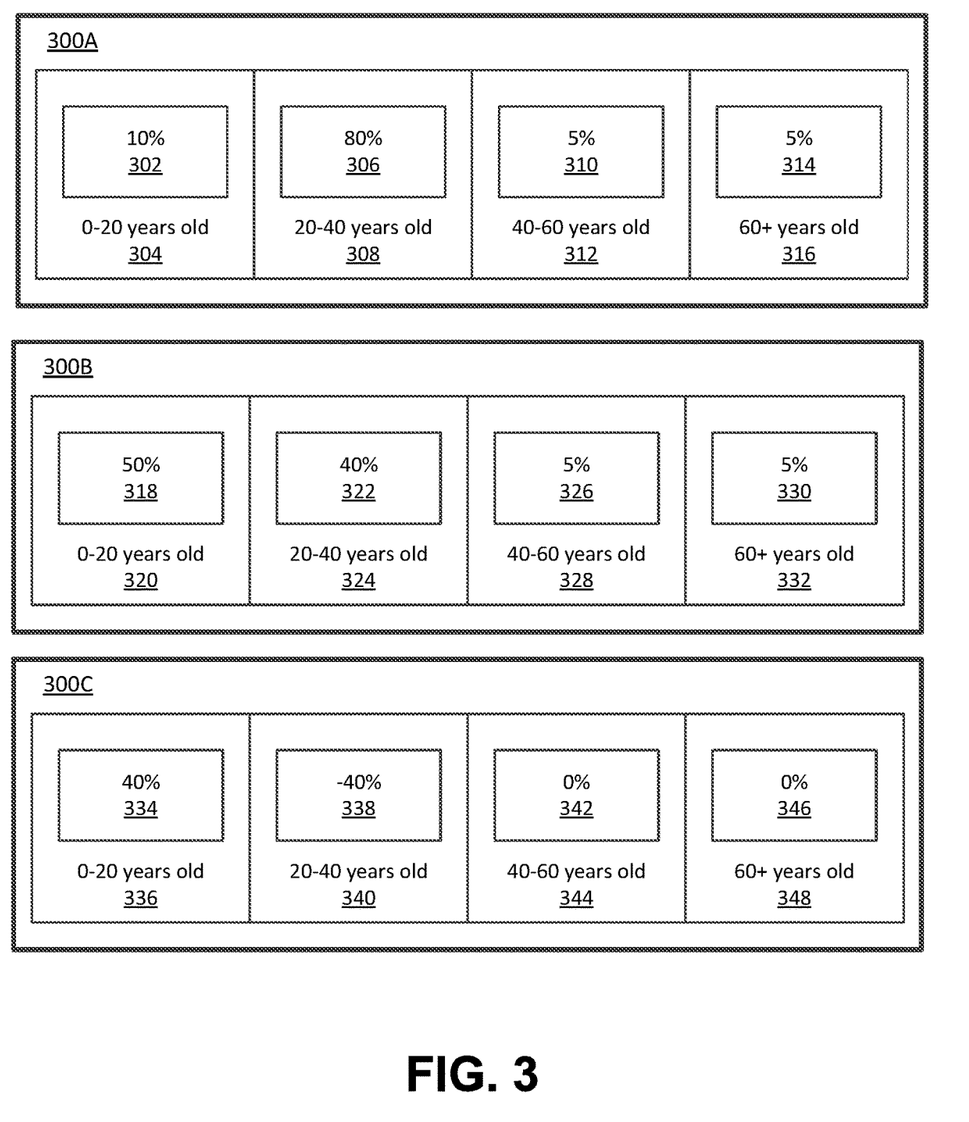
FIG. 3 is a diagram of one-dimensional vectors according to one embodiment.
Figure 4:
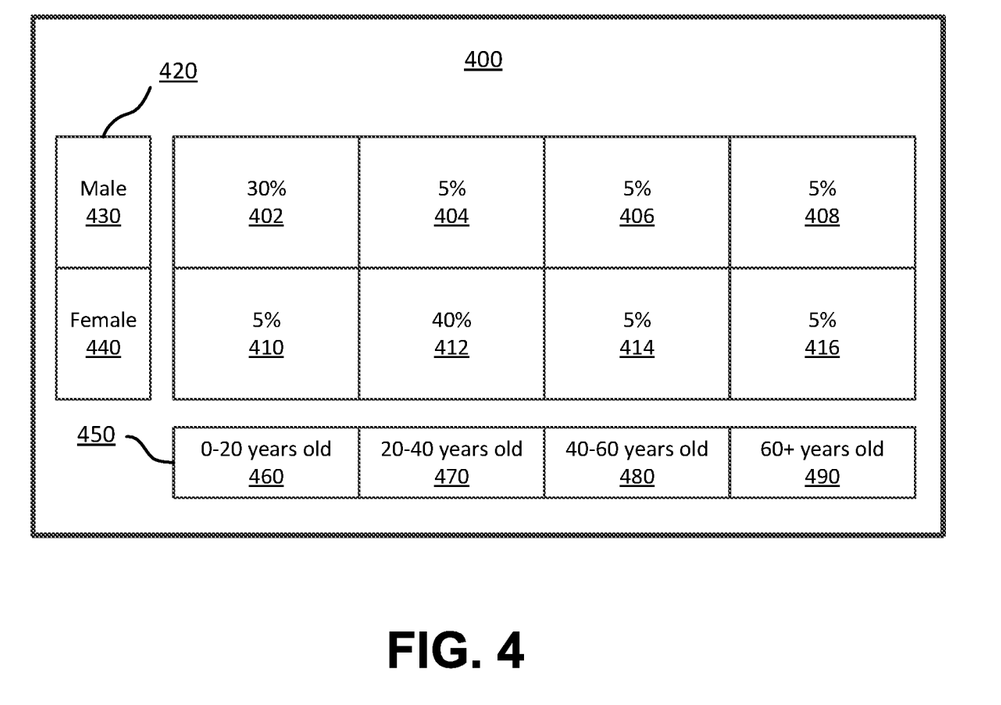
FIG. 4 is a diagram of a multi-dimensional vector according to one embodiment.
Figure 5:
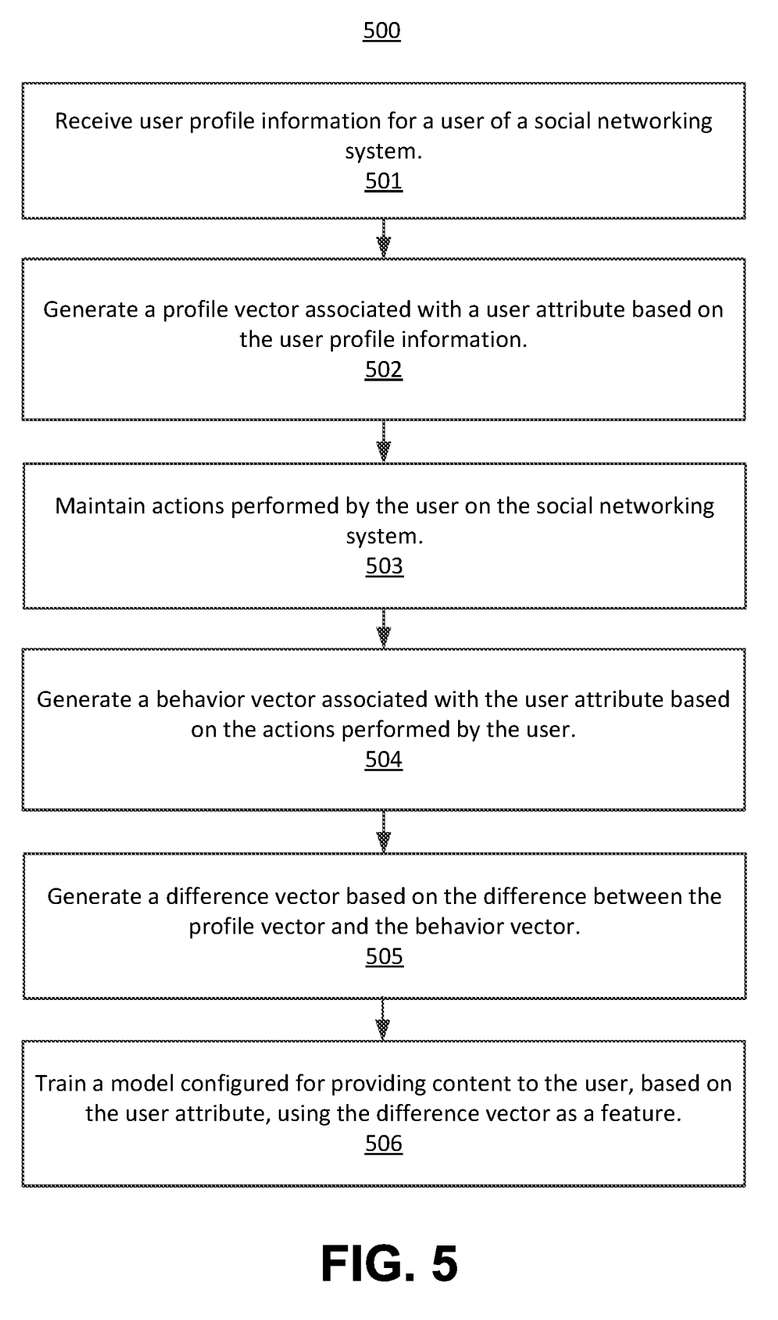
FIG. 5 is a flowchart of the process of statistical feature engineering based on user actions within the social networking system environment of FIG. 1 according to one embodiment.

Particular embodiments as described herein relate to a social networking system and related systems that integrate information describing user profiles and user behaviors, data structures that represent the information, and methods to provide content items to users of the social networking system. FIG. 1 and FIG. 2 show systems for the described embodiments, including various modules, such as a machine learning model trained to provide content items to users. FIG. 3 and FIG. 4 illustrate one-dimensional and multi-dimensional vectors that are used to describe user profile and user behavior information. FIG. 5 shows a method of using the vectors and the trained model to provide content items that match the interests of users, as determined from both the user profile information and behavioral data.

System Overview

FIG. 1 is a diagram of a system environment for statistical feature engineering within a social networking system 100 according to one embodiment. The system environment comprises one or more client devices 110 (e.g., 110A, 110B, and 110C), a social networking system 100, and a network 120. In other embodiments, different and/or additional modules can be included in the system. Client devices 110 comprise one or more computing devices that can receive input from a user of the client device 110 as well as transmit and receive data via the network 120. For instance, client devices 110 may be desktop computers, laptop computers, smart phone, tablets, or any other device including computing functionality and data communications capabilities. Client devices 110 are configured to communicate via the network 120, which may comprise any combination of local area or wide area networks, using both wired and wireless communication systems.

The social networking system 100 comprises a computing environment that allows users of the system 100 to communicate or otherwise interact with each other and access content as described herein. The social networking system 100 stores user attributes that describe the users of the system 100, including biographic, demographic, and other types of descriptive information such as educational history, salary, hobbies, work experience, and the like. The system 100 further stores data describing one or more relationships between different users and allows users to specify their relationships with other users. For example, these user-defined relationships allow users to generate relationships with other users that parallel the user's real-life relationships, such as friends, co-workers, partners, and the like. Users may be selected from predefined types of relationships or define their own types of relationships.

FIG. 2 is a diagram of the system architecture of a social networking system 100 within the environment of FIG. 1 according to one embodiment. The system 100 comprises a web server 200, action logger 210, user interface manager 220, machine learning module 230, content prediction model 240, vector module 250, news feed generator 260, training data store 270, and user profile store 280. In other embodiments, the system 100 may include additional, fewer, and/or different modules for various applications. Processes that integrate functionality of various modules of the social networking system 100 are further described in FIG. 5.

The web server 200 connects the system 100 via the network 120 to one or more client devices 110. The web server 200 may include a mail server and other types of messaging functionality for receiving and routing messages between the system 100 and client devices 110. The messages can be text and multimedia messages, queued messages (e.g., email), and the like. The action logger 210 receives communications from the web server 200 about user interactions on or off the system 100. The action logger 210 stores the information about the user interactions in the user profile store 280 and/or any other database on or off the system 100. The news feed generator 260 generates communications, e.g., in the form of content items and news feed stories, for each user about information that may be relevant to and/or interest a user. News feed stories are also referred to herein as stories or content items. Stories comprise text and/or multimedia such as a photo and video about information stored in the user profile store 280 and/or any other database of the system 100. For instance, a story may be about an action performed by the user and logged by the action logger 210. The user interface manager 220 presents the stories to users via one or more pages of the social networking system 100, e.g., displayed in each user's home page or news feed on a smart phone mobile client device 110.

The machine learning module 230 trains the content prediction model 240 configured for predicting which content items (e.g., news feed stories) will be most likely to be interesting to a user, and thus viewed by the user. The training uses training data and features stored in the training data store 270, vector module 250, and/or user profile store 280. The vector module 250 generates vectors of one or more dimensions each associated with a user attribute that describes users of the system 100, and is further described in FIG. 3 and FIG. 4.

In one embodiment, the machine learning module 230 retrieves, from the training data store 220, one or more vectors (e.g., the difference vector, profile vector, and/or behavior) as features (i.e., feature vectors) to train the content prediction model 240 using machine learning techniques known to one skilled in the art. In an embodiment, the content prediction model 240 generates ranking scores for ranking content items such as news feed stories of the social networking system 100 for a user of the system 100 when presented with user profile information and/or user action information about the user. The model 240 generates the ranking scores based on the scores associated with each attribute bin in the feature vectors and/or the user attribute associated with the feature vectors. In one embodiment, the machine learning module 230 periodically retrains (e.g., using one or more difference vectors such as vector 300C in FIG. 3) the content prediction model 240 at a determined frequency of time. The frequency of time may be based on information from the device 110 such as the average time a user engages with news feed stories of the system 100 on the device 110 each day. The content prediction model 240 provides the generated ranking scores for stories in a set of stories selected for presentation to the user to the user interface manager 220. Then, the user interface manager 220 provides the selected stories to the client device 110 for display to the user.

Feature Vectors

FIG. 3 is a diagram of one-dimensional vectors 300 according to one embodiment. In the embodiment illustrated in FIG. 3, there are three one-dimensional features vectors: a profile vector 300A, a behavior vector 300B, and a difference vector 300C generated by the vector module 250.

The profile vector 300A is based on user profile information of a user, e.g., from the user profile store 280, including demographic information (e.g., age, ethnicity, and gender), personal information (e.g., family members, income, geographical location, and education), and the like. In an embodiment, the user profile information is manually input by the user via the client device 110 to the social networking system 100. In other embodiments, the social networking system 100 instructs the user to provide the user profile information. The profile vector 300A is associated with a user attribute such as one of the types of demographic information or personal information. In the example shown in FIG. 3, the user attribute associated with the vectors is the age of the user. The profile vector comprises data corresponding to a distribution of values of the user attribute and two or more attribute bins corresponding to a range of values in the distribution of values; ranges of values may or may not overlap in the distribution of values. In one instance, in a distribution of values from 1-10, attribute bins correspond to the ranges of 1-3, 4-6, and 7-10. In another instance, in a distribution of values from 1-10, attribute bins correspond to the ranges of 1-7 and 3-10. In the example with a user attribute of age in FIG. 3, the distribution of values includes four attribute bins, 0-20 years old bin 304, 20-40 years old bin 308, 40-60 years old bin 312, and 60+ years old bin 316. In other embodiments, the number of bins and/or the age range per bin may be different. Each attribute bin has a profile bin score indicating how closely the user profile information associated with the user attribute matches attributes characteristic of the ranges corresponding to the two or more attribute bins. In one example shown in FIG. 3, the user inputs user profile information indicating that she is 25 years old and attending graduate school. The user profile information is relevant to the user attribute, age, because 25 years is the user's age and graduate school students are typically in the 20-40 year old age range. Accordingly, the profile bin score of 10% 302 corresponding to the 0-20 years old age bin 304, the profile bin score of 5% 310 corresponding to the 40-60 years old age bin 312, and the profile bin score of 5% 314 corresponding to the 60+ years old age bin 316, are lower in comparison to the profile bin score of 80% 306 corresponding to the 20-40 years old age bin 308 because the user profile information most closely matches attributes characteristic of the range corresponding to the 20-40 years old age bin 308. In this example, the profile bin scores are percentage values, where the sum of all profile bin scores in the vector 300A is 100%. In other embodiments, the profile bin scores can be any numerical value or other form of data such as text (e.g., profile bin scores of "low," "medium," and "high").

The behavior vector 300B is based on actions performed by the user on the social networking system 100 independent of the profile information, including commenting on a news feed story, liking a story, posting a photo, indicating an RSVP for an event, clicking on a link of a story, playing a video, and the like. The user actions are maintained continuously over time by the action logger 210 and can be stored in the user profile store 280 and/or any other database of the system 100. The behavior vector 300B is associated with the same user attribute, age of a user, associated with profile vector 300A in FIG. 3. Further, each attribute bin in vector 300B corresponds to an attribute bin of the two or more attribute bins in vector 300A with the same distribution of values. For instance, vector 300B also includes four attribute bins, 0-20 years old bin 320, 20-40 years old bin 324, 40-60 years old bin 328, and 60+ years old bin 332. Additionally, each attribute bin includes a behavior bin score indicating how closely the user action information associated with the user attribute matches attributes characteristic of the ranges corresponding to the two or more attribute bins. Following in the same example shown in FIG. 3, the user performs actions on the system 100 such as playing videos in news feed stories of songs by artist Taylor Swift, liking stories with text and/or photos of Nike or Forever 21 clothing products, and visiting brand pages of Chipotle Mexican Grill and Starbucks. The actions are associated with the user attribute of age because different age groups are more likely to be interested in certain musical artists and brands (e.g., being a fan of musical artist Taylor Swift). Accordingly, the behavior bin score of 50% 318 corresponding to the 0-20 years old bin 320 and the behavior bin score of 40% 322 corresponding to the 20-40 years old bin 324, are higher in comparison to the behavior bin score of 5% 326 corresponding to the 40-60 years old bin 328 and the behavior bin score of 5% 330 corresponding to the 60+ years old bin 332 because the user action information most closely matches attributes characteristic of the range corresponding to the 0-20 years old bin 320 and the 20-40 years old bin 324. That is, users in the 0-20 years old range and 20-40 years old range more frequently play Taylor Swift songs and interact with the brands, Nike, Forever 21, Chipotle Mexican Grill, and Starbucks, than do users in the 40-60 years old range and 60+ years old range based on information in the system 100.

The difference vector 300C is associated with the same user attribute, age of a user, associated with the profile vector 300A and behavior vector 300B in FIG. 3. Further, each attribute bin in vector 300C corresponds to an attribute bin of the two or more attribute bins in vector 300A and vector 300B with the same distribution of values. For instance, vector 300C also includes four attribute bins, 0-20 years old bin 336, 20-40 years old bin 340, 40-60 years old bin 344, and 60+ years old bin 348. Additionally, each attribute bin includes a difference score indicating the difference in the scores of the attribute bins in vector 300A and vector 300B corresponding to the same range of values of the distribution of values. For instance, the difference score 40% 334 is the difference between the behavior bin score 50% 318 and the profile bin score 10% 302 corresponding to the 0-20 years old age range; the difference score −40% 338 is the difference between the behavior bin score 40% 322 and the profile bin score 80% 306 corresponding to the 20-40 years old age range; the difference score 0% 342 is the difference between the behavior bin score 5% 326 and the profile bin score 5% 310 corresponding to the 40-60 years old age range; the difference score 0% 346 is the difference between the behavior bin score 5% 330 and the profile bin score 5% 314 corresponding to the 60+ years old age range.

In the example shown in FIG. 3, an attribute bin with a positive difference score indicates that attributes characteristic of the range corresponding to the attribute bin more closely match the user action information than the user profile information associated with a user attribute. On the other hand, an attribute bin with a negative difference score indicates that attributes characteristic of the range corresponding to the attribute bin more closely match the user profile information than the user action information associated with a user attribute. An attribute bin with a difference score of (or close to) zero indicates that attributes characteristic of the range corresponding to the attribute bin match the user action information and the user profile information associated with a user attribute approximately the same amount.

FIG. 4 is a diagram of a multi-dimensional vector according to one embodiment. In the embodiment illustrated in FIG. 4, the vector 400 has two dimensions, gender 420 and age 450. The gender 420 dimension includes two attribute bins, male 430 and female 440. The age 450 dimension includes four attribute bins, 0-20 years old bin 460, 20-40 years old bin 470, 40-60 years old bin 480, and 60+ years old bin 490. The vector 400 has eight scores (e.g., profile bin scores, behavior bin scores, or difference scores) corresponding to each intersection (or combination) of an attribute bin from each of the two dimensions. For example, the score 30% 402 corresponds to the intersection of male 430 and 0-20 years old 460; the score 5% 404 corresponds to the intersection of male 430 and 20-40 years old 470; the score 5% 406 corresponds to the intersection of male 430 and 40-60 years old 480; the score 5% 408 corresponds to the intersection of male 430 and 60+ years old 490; the score 5% 410 corresponds to the intersection of female 440 and 0-20 years old 460; the score 40% 412 corresponds to the intersection of female 440 and 20-40 years old 470; the score 5% 414 corresponds to the intersection of female 440 and 40-60 years old 480; the score 5% 416 corresponds to the intersection of female 440 and 60+ years old 490. In this example, the scores are percentage values, where the sum of all scores in the vector 400 is 100%. In other embodiments, the scores can be any numerical value or other form of data such as text. Further, the sum of all scores in a multi-dimensional vector does not have to equal 100%. In one embodiment, the sum of all scores in a certain dimension of a multi-dimensional vector may equal 100%.

In one embodiment, the vector 400 is a user profile vector based on user profile information of a user, e.g., from the user profile store 280, including demographic information, personal information, and the like. For example, a user associated with the profile vector 400 indicated to the system 100 (e.g., information received by the user interface manager 220 from the client device 110) that the user's gender is female and the user's age is 30 years old. Further, the user indicated that the user has a 5 year old son. Accordingly, the among the eight profile bin scores in the vector 400, the profile bin score 40% 412 is the greatest because the user's age falls within the range of the 20-40 years old 470 attribute bin and the user's gender falls within the range of the female 440 attribute bin. Additionally, the profile bin score 30% 402 is the second greatest amongst the eight profile bin scores because the user's son's age range falls within the range of the 0-20 years old 460 attribute bin and the user's son's gender falls within the range of the male 430 attribute bin. The profile bin score 40% 412 is greater than the profile bin score 30% 402 because the intersection of the female 440 and 20-40 years old 470 attribute bins corresponds to information about the user while the intersection of the male 430 and 0-20 years old 460 attribute bins corresponds to another person (i.e., a family member of the user, who may or may not also be a user of the system 100) related to the user based on information from the system 100. In an embodiment, the vector module 250 calculates profile bin scores in vectors for a user using different weights depending on the type of relationships that the user has with other people and/or users of the system 100. For instance, if the user interface manager 220 receives user profile information from a user describing the user's father and the user's grandfather, e.g., the user's father's age is within the 40-60 years old range and the user's grandfather is within the 60+ years old range, then the vector module 250 applies a weight of 1.0 to information describing the user's father and applies a weight of 0.5 to information describing the user's grandfather because the system 100 predicts that actions of the user are more likely to be influenced by information relevant to the user's father than information relevant to the user's grandfather (e.g., the user may shop for gifts more often for the user's father than for the user's grandfather).

In another embodiment, the vector 400 is a user behavior vector based on actions performed by the user on the social networking system 100, including commenting on a news feed story, liking a story, posting a photo, indicating an RSVP for an event, clicking on a link of a story, playing a video, and the like. For example, based on information logged by the action logger 210 and/or stored in the user profile store 280, a user associated with the profile vector 400 performed actions on the system 100 including reading a news feed story about shoes for toddler boys, watching a video about Bikram yoga, and viewing a brand page of Lululemon (i.e., a yoga-inspired athletic apparel company). Accordingly, the among the eight behavior bin scores in the vector 400, the behavior bin score 40% 412 is the greatest because, based on the system 100, users who have a gender of female 440 and an age within the 20-40 years old 470 range are more likely to interact with content related to yoga (e.g., Bikram yoga videos and a Lululemon brand page) on the system 100. Additionally, the behavior bin score 30% 402 is the second greatest amongst the eight behavior bin scores because, based on the system 100, users who have a gender of male 430 and an age within the 0-20 years old 460 range are more likely to benefit from and/or interact with content related to clothes for toddler boys. The behavior bin score 40% 412 is greater than the behavior bin score 30% 402 because, out of the three actions described in this example, two of the actions correspond to characteristics of the intersection of the female 440 and 20-40 years old 470 attribute bins, while only one of the actions correspond to characteristics of the intersection of the male 430 and 0-20 years old 460 attribute bins. In an embodiment, the vector module 250 calculates behavior bin scores in vectors for a user using different weights depending on the type of action that the user performs on the system 100. For instance, the vector module 250 may apply a weight of 0.8 to user action information associated with watching a video in a content item (e.g., a news feed story) and apply a weight of 1.0 to user action information associated with visiting a brand page on the system 100.

In yet another embodiment, the vector 400 is a difference vector based on the difference between a profile vector and a behavior vector associated with the same user attribute and including the same dimensions and attribute bins for each dimension. For instance, the vector module 250 calculates the difference score 30% 402 of a difference vector 400 is based on the difference in the scores corresponding to the intersection of the male 430 attribute bin and the 0-20 years old 460 attribute bin in the profile vector and the behavior vector; similarly, the difference score 40% 412 of a difference vector 400 is based on the difference in the scores corresponding to the intersection of the female 440 attribute bin and the 20-40 years old 470 attribute bin in the profile vector and the behavior vector.

Process Flow

FIG. 5 is a flowchart of the process 500 of statistical feature engineering based on user actions within the social networking system 100 environment of FIG. 1 according to one embodiment. The process 500 may include different or additional steps than those described in conjunction with FIG. 5 in some embodiments or perform steps in different orders than the order described in conjunction with FIG. 5.

The social networking system 100 initially receives 501 user profile information for a user of the system 100 such as demographic data, personal data, and the like, from a client device of the user and/or a database of the social networking system 100 (e.g., user profile store 280). The system 100, e.g., vector module 250, then generates 502 a profile vector (e.g., vector 300A in FIG. 3) associated with a user attribute (e.g., age or gender) based on the user profile information. The profile vector comprises profile bin scores for each of two or more attribute bins in a distribution of values of the user attribute. In some embodiments, the profile vector may be multi-dimensional with n number of dimensions and be associated with n number of user attributes. The system 100 maintains 503 actions performed by the user on the system 100 such as interactions with news feed stories and other users of the system 100, i.e., interactions logged by the action logger 210 and stored in the user profile store 280. Next, the system 100, e.g., vector module 250, generates 504 a behavior vector (e.g., vector 300B in FIG. 3) associated with the user attribute (or user attributes in embodiments with multi-dimensional vectors) based on the actions performed by the user. The behavior vector comprises behavior bin scores for each of the two or more attribute bins in a distribution of values of the user attribute. The system 100, e.g., vector module 250, generates 505 a difference vector (e.g., vector 300C in FIG. 3) based on the difference between the profile vector and the behavior vector. In particular, the difference scores for each attribute bin in the difference vector is the difference between the scores (e.g., profile bin scores and behavior bin scores), of the corresponding attribute bins (or intersections of attribute bins in embodiments with multi-dimensional vectors) in the profile vector and the behavior vector. For example, a profile bin score of 10% in the profile vector and a behavior bin score of 30% in the behavior vector results in a difference score of 20% in the difference vector. Then, the system 100, e.g., machine learning module 230, trains 506 a model (e.g., a content prediction model 240) configured for providing content (e.g., news feed stories provided by the news feed generator 260) to the user based on the user attribute using the difference vector as a feature.

In one embodiment, an expert (e.g., a data scientist) inputs training data sets to the system 100, e.g., through the user interface of a client device 110. The training data sets may be profile vectors, behavior vectors, and difference vectors based on information about a population of users. For instance, users who are young mothers with a son are typically interested in information relevant to 20-40 year old females and 0-20 year old males. Thus, the expert can create a vector such as vector 400 in FIG. 4 to represent the observed and/or predicted actions of users in the population of young mothers with a son. In one example, the expert provides a difference vector (e.g., vector 400) including difference scores based on information about a population of users (e.g., population of young mothers with a son). Further, the provided difference vector includes one or more dimensions, a user attribute associated with the vector, and a distribution of values of the user attribute. The machine learning module 230 uses the information such as difference scores of the provided vector to train the content predication model 240. In other embodiments, training data sets are generated using machine learning techniques and input automatically to the system 100 or manually by the expert, e.g., the user interface manager 220 provides instructions to the expert via the client device 110 to input data sets in the form of vectors similar to the vectors generated by the vector module 250.

Use Case: Content Selection

In one embodiment, the content prediction model 240 implements an auction model for selecting a set of content items for presentation to a user. The content items can be any content presented to the user in the social networking system, e.g., news feed stories, advertisements, and the like. The system 100 receives a request for content items from a device 110 of the user. The news feed generator 260 provides content items that are candidates (i.e., candidate content items) for display to the user along with associated bid values for each candidate content item. The bid value of a candidate content item may have any suitable format for representing the compensation (e.g., monetary value) received by the system 100 if the candidate content item is presented to the user and/or if the user interacts with the candidate content item. Different pricing models may be used to determine the bid amount, such as a cost-per-click (i.e., "CPC") model where the bid amount is based on a per-user-interaction with the candidate content item, a cost-per-impression (i.e., "CPI") model where the bid amount is based on the number of times a candidate content item is presented.

The content prediction model 240 calculates an expected value for the candidate content items based on the bid values of the content items. The expected value of a candidate content item represents the value to the social networking system 100 of the candidate content item. For example, an expected value accounts for a probability of a user accessing the content item by multiplying the content item's bid value by a probability of the user interacting with the content item. In one embodiment, the content prediction model 240 determines the probability of a user interacting with the candidate content item based on the vectors (i.e., profile vectors, behavior vectors, and/or difference vectors) generated by the vector module 250. For instance, referring back to difference vector 300C in FIG. 3, if the difference vector 300C is associated with a user, then the model 240 determines a high (e.g., 80%) probability that the user will interact with candidate content items (e.g., news feed stories including text and/or multimedia, or sponsored content) that 0-20 year old users typically interact with; in comparison, the model 240 determines a low probability (e.g., 1%) that the user will interact with candidate content items that 60+ years old users typically interact with because the difference score 40% 334 of the 0-20 years old 336 attribute bin is greater than the score difference 0% 346 of the 60+ years old attribute bin 348. For example, the probability that the user associated with vector 300C will interact with a content item describing a college scholarship will be greater than the probability that the user will interact with a content item describing a retirement home because users who are college students are likely in the 18-22 year old range (i.e., overlapping the 0-20 years old range), and users who are close to retirement are likely beyond the age of 60 years old.

Based on the calculated expected values, the content prediction model 240 ranks and selects candidate content items for presentation to the user on the client device 110. For example, the model 240 selects one or more candidate stories with the highest expected value relative to the expected values of all candidate content items. In a different example, the model 240 selects the candidate content items with an expected value greater than a first threshold value (e.g., a minimum) and/or less than a second threshold value (e.g., a maximum). The model 240 may apply one or more rules when selecting the candidate stories. For example, a rule may specify a minimum number of candidate content items that have a photo associated with the content items or a maximum number of candidate content items selected for presentation per day (e.g., a third-party wants to present a sponsored content item one hundred times each weekday).

In one example use case, a third party provides to the social networking system 100 information for candidate content items for presentation to a target population of users of the system 100 and information about the target population. The information for candidate content items may include sponsored content in the form of text and/or multimedia such as photos and videos. Further, the information for candidate content items may also include bid values for the stories. In one embodiment, the provided information about the target population is represented as one or more vectors, e.g., if the target population was young mothers with a son, vector 400 in FIG. 4 represents the target population. In a different embodiment, the vector module 250 generates one or more vectors to represent the target population based on the provided information about the target population. For instance, the provided information may be a clear-text description or data table describing the target population, which the vector module 250 converts into the format of a vector such as a difference vector (e.g., one-dimensional difference vector 300C in FIG. 3 or multi-dimensional difference vector 400 in FIG. 4) used by the system 100 to train the content prediction model 240. The model 240 determines the probability that users of the system 100 will interact with the content items including the information for candidate content items based on the information about the target population (i.e., vectors describing the target population). That is, the model 240 generates the probabilities and/or expected values when provided with one or more vectors describing the target population as input.

Following in the same example use case, the content prediction model 240 generates reports to be provided to the third party, e.g., provided by the user interface manager 220 from the system 100 to a client device 110. The reports may include information such as statistics about the users of the social networking system 100 who interact with content items including the information for candidate content items provided by the third party. For example, the model 240 forms a single vector by aggregating multiple vectors associated with users who play a video of a content item promoting a Lego toy set with a target population of solely 0-20 year old users based on the provided information from the third party. The vector may indicate the average and standard deviation age of users who actually interacted with the content item with the Lego toy set video. The indicated average age may fall within the 0-20 year old range targeted by the third party or a different range such as the 60+ year old range. The third party may use statistics from the report to adjust the target population. For instance, if there are more users in the 60+ years old range interacting with the Lego toy set content item than in the 0-20 years old range, then the third party provides a vector to the system 100 that targets 0-20 year old users 25% of the time and 60+ year old users the other 75% of the time. As a result, the expected value of the Lego toy set content item is likely to be greater for more users because the target population should more closely match the actual population of users who interact with the content item (e.g., both 0-20 year olds and 60+ year olds in this case). Accordingly, a greater number of users of the system 100 may be presented with the Lego toy set content item on their news feeds, which is desired by the third party.

In a different example use case, a third party provides to the social networking system 100 information for candidate stories for presentation to users of the system 100 without information about the target population for the stories. In this example, the vector module 250 generates, based on information from the system 100 (e.g., user actions logged by the action logger 210 and stored in the user profile store 280), a vector representing characteristics of the users who most frequently interact with stories including the provided information (e.g., vector 400 in FIG. 4). The machine learning module 230 then uses the vector to represent the target population and train the content prediction model 240 using the vector as a feature.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving user profile information for a user of a social networking system;
   generating a profile vector associated with a user attribute based on the user profile information, the profile vector comprising a profile bin score for each of a plurality of attribute bins in a distribution of values of the user attribute, each attribute bin corresponding to a range of values in the distribution of values and each profile bin score of an attribute bin indicating how closely the user profile information matches other user profile information of users of the social networking system associated with the range of values corresponding to the attribute bin;
   maintaining a plurality of actions performed by the user in the social networking system;
   generating a behavior vector associated with the user attribute based on the plurality of actions performed by the user, the behavior vector comprising a behavior bin score for each of the range of values in the distribution of values corresponding to the plurality of attribute bins for the user attribute, each behavior bin score of an attribute bin indicating how closely the plurality of actions performed by the user matches other actions performed by the users of the social networking system associated with the range of values corresponding to the attribute bin;
   generating a difference vector by, for each of the plurality of attribute bins:
   determining a difference score to be included in the difference vector based on a difference between the profile bin score for the attribute bin and the behavior bin score for the attribute bin;

accessing a trained machine learning model that predicts a probability that the user will interact with a content item on a client device of the user based, at least in part, on the difference vector as an input feature;

applying the machine learning model to a set of features for the user, the set of features including the difference vector, to determine the probability that the user will interact with the content item on the client device of the user; and periodically retraining the machine learning model at a determined frequency of time selected based on an average amount of time the user engages with the social networking system using one or more difference vectors of other users of the social networking system.

2. The method of claim 1, wherein the profile vector has two or more dimensions including a first dimension and a second dimension, the first dimension associated with the user attribute, the second dimension associated with a different user attribute, the different user attribute associated with a different range of values in a different distribution of values, wherein the behavior vector has the two or more dimensions, and wherein the difference vector includes a difference score for each pair of one range of the range of values and another range of the different range of values.

3. The method of claim 1, wherein the profile bin scores are percentage values that sum to 100% and wherein the behavior bin scores are percentage values that sum to 100%, wherein the difference scores are determined by subtracting the percentage values of the user bin scores from the percentage values of the behavior bin scores.

4. The method of claim 1, further comprising:
generating a second difference vector using additional user profile information of a target population of users of the social networking system and actions performed by the target population; and
wherein the set of features of the user further includes the second difference vector.

5. The method of claim 1, further comprising:
receiving a plurality of content items, each content item of the plurality of content items associated with a bid value, the plurality of content items including the content item;
for each content item of the plurality of content items, applying the machine learning model to determine another probability that the user will interact with the content item of the plurality of content items;
determining an expected value for each content item of the plurality of content items based at least in part on the bid value and the probability corresponding to the content item; and
providing one or more content items of the plurality of content items to the client device of the user, the expected value of each of the one or more content items being greater than a threshold expected value.

6. The method of claim 5, wherein the plurality of content items include sponsored content, and wherein the bid values of the plurality of content items are represented by monetary amounts.

7. A computer program product comprising a computer readable storage medium having instructions encoded therein that, when executed by a processor, cause the processor to:
receive user profile information for a user of a social networking system;
generate a profile vector associated with a user attribute based on the user profile information, the profile vector comprising a profile bin score for each of a plurality of attribute bins in a distribution of values of the user attribute, each attribute bin corresponding to a range of values in the distribution of values and each profile bin score of an attribute bin indicating how closely the user profile information matches other user profile information of users of the social networking system associated with the range of values corresponding to the attribute bin;
maintain a plurality of actions performed by the user in the social networking system;
generate a behavior vector associated with the user attribute based on the plurality of actions performed by the user, the behavior vector comprising a behavior bin score for each of the range of values in the distribution of values corresponding to the plurality of attribute bins for the user attribute, each behavior bin score of an attribute bin indicating how closely the plurality of actions performed by the user matches other actions performed by the users of the social networking system associated with the range of values corresponding to the attribute bin;
generate a difference vector by, for each of the plurality of attribute bins:
determining a difference score to be included in the difference vector based on a difference between the profile bin score for the attribute bin and the behavior bin score for the attribute bin;
access a trained machine learning model that predicts a probability that the user will interact with a content item on a client device of the user based, at least in part, on the difference vector as an input feature;
apply the machine learning model to a set of features for the user, the set of features including the difference vector, to determine the probability that the user will interact with the content item on the client device of the user; and
periodically retrain the machine learning model at a determined frequency of time selected based on an average amount of time the user engages with the social networking system using one or more difference vectors of other users of the social networking system.

8. The computer program product of claim 7, wherein the profile vector has two or more dimensions including a first dimension and a second dimension, the first dimension associated with the user attribute, the second dimension associated with a different user attribute, the different user attribute associated with a different range of values in a different distribution of values, wherein the behavior vector has the two or more dimensions, and wherein the difference vector includes a difference score for each pair of one range of the range of values and another range of the different range of values.

9. The computer program product of claim 7, wherein the profile bin scores are percentage values that sum to 100% and wherein the behavior bin scores are percentage values that sum to 100%, wherein the difference scores are determined by subtracting the percentage values of the user bin scores from the percentage values of the behavior bin scores.

10. The computer program product of claim 7, further comprising instructions encoded therein that, when executed by the processor, cause the processor to:
generate a second difference vector using additional user profile information of a target population of users of the social networking system and actions performed by the target population; and
wherein the set of features of the user further includes the second difference vector.

11. The computer program product of claim 7, further comprising instructions encoded therein that, when executed by the processor, cause the processor to:
- receive a plurality of content items, each content item of the plurality of content items associated with a bid value, the plurality of content items including the content item;
- for each content item of the plurality of content items, applying the machine learning model to determine another probability that the user will interact with the content item of the plurality of content items;
- determine an expected value for each content item of the plurality of content items based at least in part on the bid value and the probability corresponding to the content item; and
- provide one or more content items of the plurality of content items to the client device of the user, the expected value of each of the one or more content items being greater than a threshold expected value.

12. The computer program product of claim 11, wherein the plurality of content items include sponsored content, and wherein the bid values of the plurality of content items are represented by monetary amounts.

13. A system comprising a web server configured for:
- receiving user profile information for a user of a social networking system;
- generating a profile vector associated with a user attribute based on the user profile information, the profile vector comprising a profile bin score for each of a plurality of attribute bins in a distribution of values of the user attribute, each attribute bin corresponding to a range of values in the distribution of values and each profile bin score of an attribute bin indicating how closely the user profile information matches other user profile information of users of the social networking system associated with the range of values corresponding to the attribute bin;
- maintaining a plurality of actions performed by the user in the social networking system;
- generating a behavior vector associated with the user attribute based on the plurality of actions performed by the user, the behavior vector comprising a behavior bin score for each of the range of values in the distribution of values corresponding to the plurality of attribute bins for the user attribute, each behavior bin score of an attribute bin indicating how closely the plurality of actions performed by the user matches other actions performed by the users of the social networking system associated with the range of values corresponding to the attribute bin;
- generating a difference vector by, for each of the plurality of attribute bins:
  - determining a difference score to be included in the difference vector based on a difference between the profile bin score for the attribute bin and the behavior bin score for the attribute bin;
- accessing a trained machine learning model that predicts a probability that the user will interact with a content item on a client device of the user based, at least in part, on the difference vector as an input feature;
- applying the machine learning model to a set of features for the user, the set of features including the difference vector, to determine the probability that the user will interact with the content item on the client device of the user; and
- periodically retraining the machine learning model at a determined frequency of time selected based on an average amount of time the user engages with the social networking system using one or more difference vectors of other users of the social networking system.

14. The system of claim 13, wherein the profile vector has two or more dimensions including a first dimension and a second dimension, the first dimension associated with the user attribute, the second dimension associated with a different user attribute, the different user attribute associated with a different range of values in a different distribution of values, wherein the behavior vector has the two or more dimensions, and wherein the difference vector includes a difference score for each pair of one range of the range of values and another range of the different range of values.

15. The system of claim 13, wherein the profile bin scores are percentage values that sum to 100% and wherein the behavior bin scores are percentage values that sum to 100%, wherein the difference scores are determined by subtracting the percentage values of the user bin scores from the percentage values of the behavior bin scores.

16. The system of claim 13, wherein the web server is further configured for:
- generating a second difference vector using additional user profile information of a target population of users of the social networking system and actions performed by the target population; and
- wherein the set of features of the user further includes the second difference vector.

17. The system of claim 13, wherein the web server is further configured for:
- receiving a plurality of content items, each content item of the plurality of content items associated with a bid value, the plurality of content items including the content item;
- for each content item of the plurality of content items, applying the machine learning model to determine another probability that the user will interact with the content item of the plurality of content items;
- determining an expected value for each content item of the plurality of content items based at least in part on the bid value and the probability corresponding to the content item; and
- providing one or more content items of the plurality of content items to the client device of the user, the expected value of each of the one or more content items being greater than a threshold expected value.

18. The system of claim 17, wherein the plurality of content items include sponsored content, and wherein the bid values of the plurality of content items are represented by monetary amounts.

* * * * *